US007213614B2

United States Patent
Chen

(10) Patent No.: US 7,213,614 B2
(45) Date of Patent: May 8, 2007

(54) AUTOMATIC COLD WATER FEED-BACK MECHANISM FOR SINGLE HANDLED FAUCET

(75) Inventor: Mei-Li Chen, Taipei (TW)

(73) Assignee: Kuching International Ltd., Taichung Hsien (TW)

( * ) Notice: Subject to any disclaimer, the term of this patent is extended or adjusted under 35 U.S.C. 154(b) by 380 days.

(21) Appl. No.: 10/825,110

(22) Filed: Apr. 16, 2004

(65) Prior Publication Data

US 2005/0229984 A1    Oct. 20, 2005

(51) Int. Cl.
*F16K 11/074* (2006.01)
*F16K 3/30* (2006.01)

(52) U.S. Cl. .................... 137/625.4; 251/313

(58) Field of Classification Search ........... 137/625.17, 137/625.4, 625.41; 251/313
See application file for complete search history.

(56) References Cited

U.S. PATENT DOCUMENTS 4,220,175 A * 9/1980 Keller et al. ............... 137/607
4,784,180 A * 11/1988 Sieberhagen ............ 137/625.4
5,141,153 A * 8/1992 Jeffress ..................... 236/93 B
6,966,335 B2 * 11/2005 Chen ..................... 137/625.17
2006/0086394 A1 * 4/2006 Molina ....................... 137/606

* cited by examiner

*Primary Examiner*—John Rivell
(74) *Attorney, Agent, or Firm*—Egbert Law Offices

(57) ABSTRACT

An automatic cold water feed-back mechanism for a single handled faucet includes a valve housing for a valve stick, a base mount, a switching valve, a valve seat to be adapted therein, a limiting valve mounted at the upper section of the valve housing, and a cold water feed-back mechanism made up of an actuating member and a spring member to be mutually engaged with the limiting valve thereof. The valve stick is provide with a linkage rod properly protruding at the upper surface of a valve stick seat thereon to be fixedly attached to a locating support block of the actuating member thereof. In operation when the valve stick is switched off at the position of either mixed cold/hot water or hot water discharge, the valve stick is flexibly retracted back to its position of cold-water discharge via the spring member of the cold water feed-back mechanism thereof. Thus, the faucet can automatically resume its position and safely keep in the state of cold-water discharge if switched open again in use, efficiently avoiding the ignition of a hot water supplier instantaneously so as to prevent the waste of energy, and securely protecting the safety of children in the family without being scared or even scalded by hot water accidentally in practical use.

4 Claims, 4 Drawing Sheets

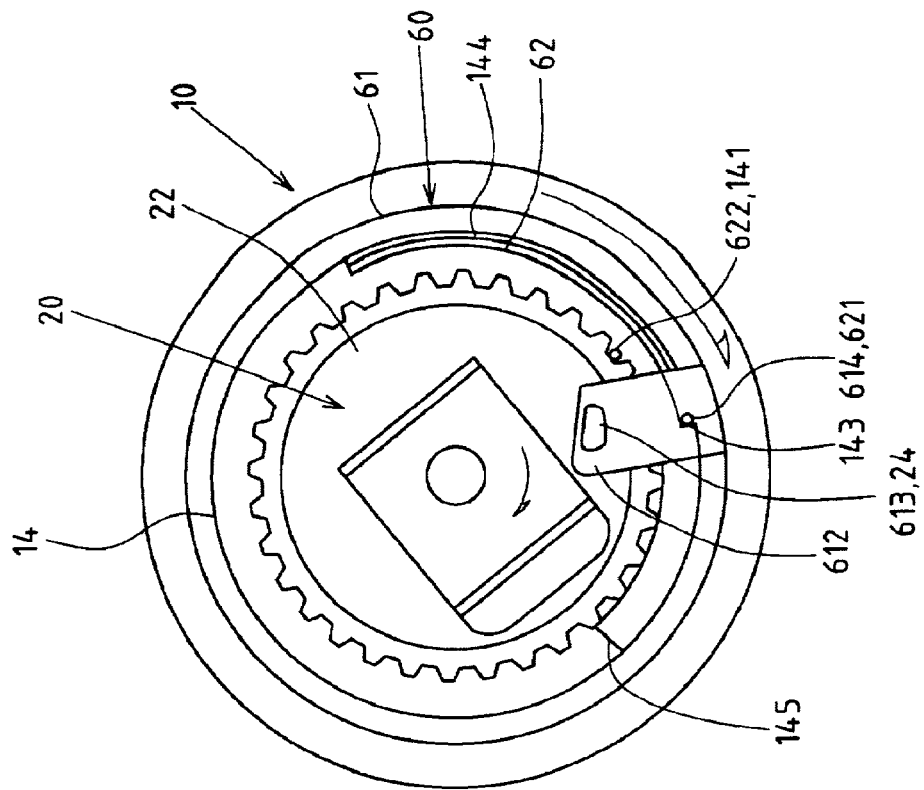
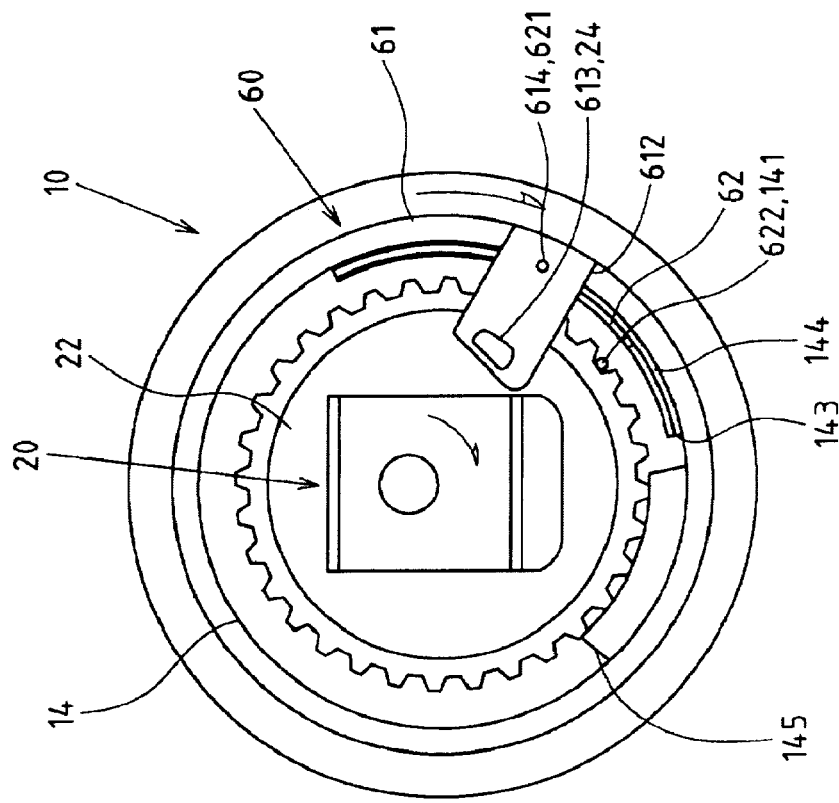

AUTOMATIC COLD WATER FEED-BACK MECHANISM FOR SINGLE HANDLED FAUCET

BACKGROUND OF THE INVENTION

The present invention is related to an automatic cold water feed-back mechanism for a single handled faucet, including a valve housing for a valve stick, a base mount, a switching valve, a valve seat to be adapted therein, a limiting valve mounted at the upper section of the valve housing, and a cold water feed-back mechanism made up of an actuating member and a spring member to be mutually engaged with the limiting valve thereof wherein the valve stick is linked with the cold water feed-back mechanism via a linkage rod; whereby, when the valve stick is switched off at the position of either mixed cold/hot water or hot water discharge, the valve stick is flexibly retracted back to its position of cold water discharge via the spring member of the cold water feed-back mechanism thereof. Thus, the faucet can automatically resume its position and safely keep in the state of cold-water discharge if switched open again in use, efficiently avoiding the ignition of a hot water supplier instantaneously so as to prevent the waste of energy, and securely protecting the safety of children in the family without being scared or even scalded by hot water accidentally in practical use.

A conventional single handled faucet cannot resume its position of cold-water discharge automatically after being switched off at the position of either mixed cold/hot water or hot water discharge. Thus, the faucet must be manually adjusted to retract back to the location of cold-water discharge. In case of forgetting to readjust the faucet out of negligence, the discharge of hot water can easily ignite a hot water supplier and cause a waste of energy. Besides, children in the family can easily get scared or even scalded by the discharge of hot water accidentally in use.

SUMMARY OF THE PRESENT INVENTION

It is, therefore, the primary purpose of the present invention to provide an automatic cold water feed back mechanism for a single-handled faucet, including a valve housing for a valve stick, a base mount, a switching valve, a valve seat to be adapted therein, a limiting valve mounted at the upper section of the valve housing, and a cold water feed-back mechanism made up of an actuating member and a spring member to be engaged with the limiting valve thereof wherein the valve stick is linked with the cold water feed-back mechanism via a linkage rod; whereby, when the valve stick is switched off at the position of either mixed cold/hot water or hot water discharge, the valve stick is flexibly retracted back to its position of cold water discharge via the spring member of the cold water feed-back mechanism thereof. Thus, the faucet can automatically resume its position and safely keep in the state of cold-water discharge if switched open again in use, efficiently avoiding the ignition of a hot water supplier instantaneously so as to prevent the waste of energy, and securely protecting the safety of children in the family without being scared or even scalded by hot water accidentally in practical use.

It is, therefore, the second purpose of the present invention to provide an automatic cold water feed-back mechanism for a single-handled faucet wherein when the valve stick is switched on for water discharge, linkage section of the valve stick is tightly abutted against the inner lateral side of a retaining hole of the switching valve with a frictional coefficient thereof larger than the torque of the spring member thereof so as to actuate the upper switching valve and open the valve core thereby, permitting the valve stick precisely located in place for the discharge of mixed cold/hot water or hot water without being interfered by the influence of the spring member thereof to achieve the best using condition thereof.

It is, therefore, the third purpose of the present invention to provide an automatic cold water feed-back mechanism for a single-handled faucet wherein when the valve stick is switched off, the linkage section thereof is simply located at the retaining hole of the switching valve therein with the actuating force of the valve stick thereof smaller than the torque of the spring member, permitting the spring member thereof to retract the valve stick back to its position of cold water discharge in a precise and fast manner.

BRIEF DESCRIPTION OF THE DRAWINGS

FIG. 3 is a diagram showing the present invention switched on for the discharge of mixed cold/hot water in operation.

FIG. 4 is a diagram showing the present invention switched on for the discharge of hot water in operation.

DETAILED DESCRIPTION OF THE PREFERRED EMBODIMENTS

Figure 1:
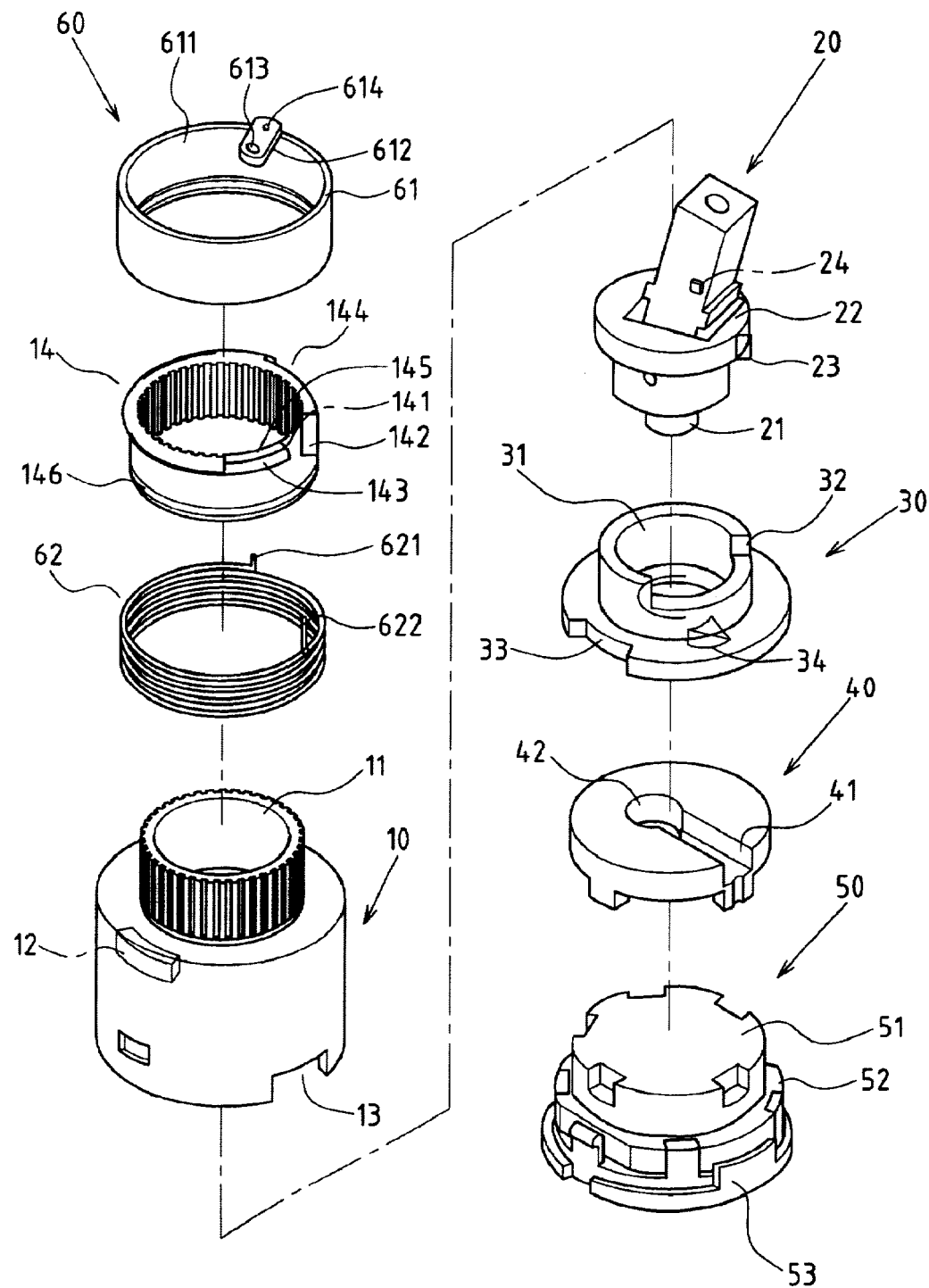
FIG. 1 is a perspective exploded view of the present invention.

Please refer to FIG. 1. The present invention is related to an automatic cold water feed-back mechanism for a single handled faucet, including a valve housing 10, a valve stick 20, a base mount 30, a switching valve 40, a valve seat 50, and a cold water feed-back mechanism 60. The valve housing 10, a two-staged sheltering case, has a valve chamber 11 disposed at the interior thereof, a locating block 12 protruding at the inner top surface of the valve chamber 11 thereof, and a plurality of insert grooves 13 cut at the lower periphery thereof. A limiting valve 14 is applied to the upper section of the valve housing 10 and registered therewith. The limiting valve 14 is made up of an arc-shaped locating groove 141 preset at the inner wall therein, a through hole 142 communicating with the locating groove 141 thereof, an annular stop flange 143 protruding outwards at the upper opening thereof, a movement space 144 properly cut at the outer periphery of the stop flange 143 thereon, a limiting block 145 protruding at the upper surface of the stop flange 143 thereon, and a stepwise limiting seat 146 extending outwards at the lower opening thereof. The valve stick 20 is provided with a linkage section 21 protruding downwards at the bottom thereof, a two-staged valve stick seat 22 disposed at the middle section thereof, a turning protruded block 23 extending downwards at one side of the upper stage of the valve stick seat 22 thereof, and a linkage rod 24 protruding at preset spot of the upper surface thereon. The base mount 30, a two-staged member, is equipped with an engaging hole 31 disposed at the center thereof, a turning cut opening 32 defining one side of the upper section thereof, a locating recess 33 cut at one side of the lower section thereof, and a protruded guide spot 34 disposed at one side of the bottom surface thereon. The switching valve 40 has a grooved channel 41 cut at one side thereon, and a retaining hole 42 communicating with the grooved channel 41 thereof. The valve seat 50 is made up of an upper switch valve 51, and a lower switch valve 52 with a plurality of insert parts 53 extending upwards at the lower periphery thereof.

The cold water feed-back mechanism 60 is made up of an actuating member 61 and a spring member 62. The actuating member 61 has a limiting engaging hole 611 disposed at the center thereon to be registered with the limiting valve 14 thereby, and a locating support block 612 extending transversely inwards at one side of the upper edge thereon. A coupling hole 613 shaped like the linkage rod 24 of the valve stick 20 thereof and a fixing hole 614 are respectively disposed at the surface of the locating support block 612 thereon. The spring member 62 is provided with an actuating insert leg 621 protruding vertically upwards at the upper edge thereof, and an L-shaped locating hook 622 extending inwards at the lower edge thereof.

Figure 2:
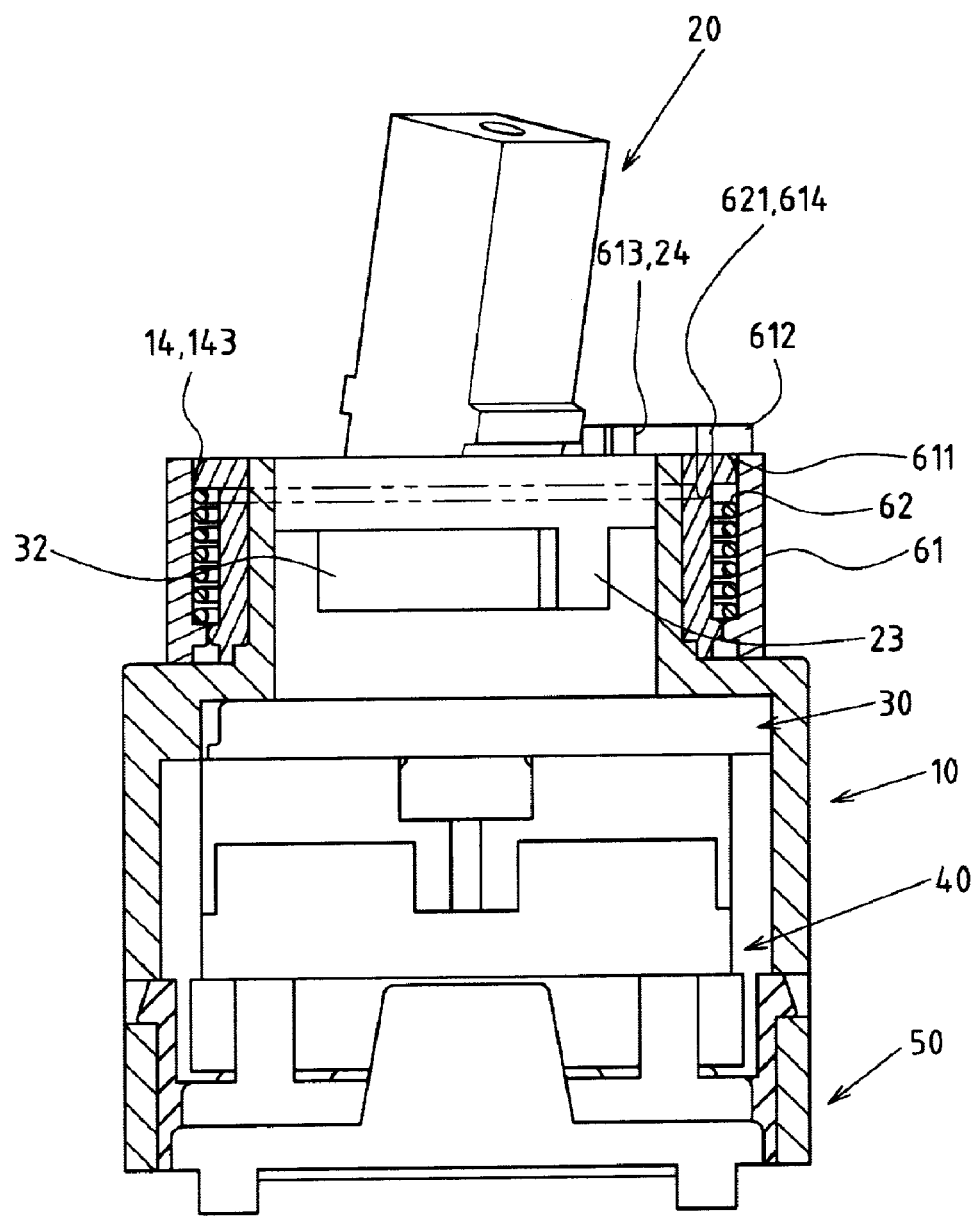
FIG. 2 is a cross sectional view of the present invention in assembly.

Please refer to FIG. 2. In assembly, the two-staged valve stick seat 22 of the valve stick 20 is led and joined to the engaging hole 31 of the base mount 30 with the turning protruded block 23 thereof retained at the turning cut opening 32 therein, and the linkage section 21 extending downwards at the bottom of the base mount 30 thereof. The switching valve 40 mounted to the valve seat 50 at the bottom thereof is joined to the mutually engaged valve stick 20 and the base mount 30 thereof with the protruded guide spot 34 of the base mount 30 and the linkage section 21 of the valve stick 20 located at the grooved channel 41 and the retaining hole 42 thereof respectively. The valve housing 10 is applied from top to bottom to adapt the valve stick 20, the base mount 30, and the switching control valve 40 respectively at the valve chamber 11 therein with the locating block 12 thereof engaged with the locating recess 33 of the base mount 30 thereof. Thus, the base mount 30 is stably located at the valve housing 10 therein, refraining from the rotation relative to the valve housing 10 thereof. The insert parts 53 of the valve seat 50 are fixedly joined to the insert grooves 13 of the valve housing 10 thereof for secure location thereby. The spring member 62 of the cold water feed-back mechanism 60 is joined to the outer side of the limiting valve 14 and located at the annular stop flange 143 and the limiting seat 146 there-between. Meanwhile, the locating hook 622 of the spring member 62 is led through the through hole 142 to abut against the arc-shaped locating groove 141 and fixed therein, and the actuating insert leg 621 thereof is precisely located in flexible abutment against one side of the movement space 144 of the limiting valve 14 thereof. The limiting valve 14 is then mounted to the valve housing 10, and the valve stick 20 is rotated to the position of cold-water discharge with the linkage rod 24 precisely located opposite to the actuating insert leg 621 of the spring member 62 thereof. The limiting engaging hole 611 of the actuating member 61 is led from top to bottom to be registered with the limiting valve 14 till the actuating insert leg 621 and the linkage rod 24 thereof engaged with the fixing hole 614 and the coupling hole 613 of locating support block 612 respectively and located therein. Thus, via the locating support block 612 of the actuating member 61, the linkage rod 24 of the valve stick 20 is flexibly retracted by the actuating insert leg 621 of the spring member 62 to set the turning protruded block 23 thereof constantly at one side of the turning cut opening 32 thereof, precisely locating the valve stick 20 at the position of cold-water discharge to complete the assembly of the present invention.

Figure 5:
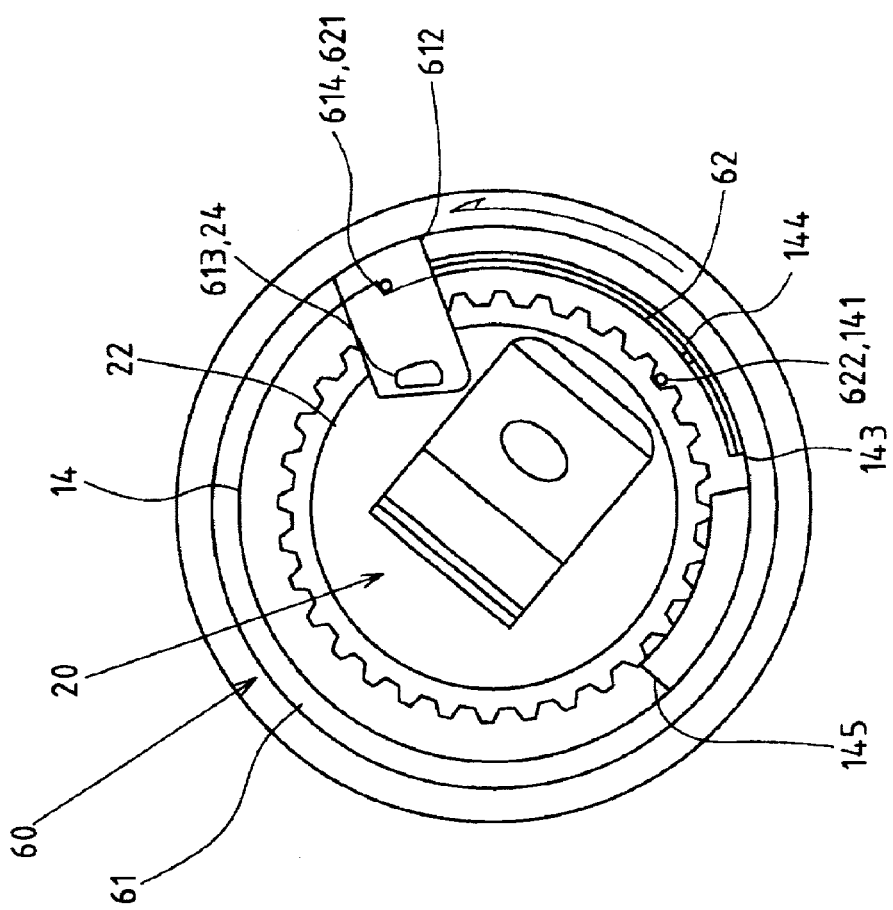
FIG. 5 is a diagram showing the present invention automatically resuming its position of cold-water discharge after being switched off in operation.

Please refer to FIGS. 3 to 5 inclusive. When the valve stick 20 is rotated to the position for the discharge of mixed cold/hot water as shown in FIG. 3, the linkage rod 24 will actuate the locating support block 612 of the actuating member 61 with the actuating insert leg 621 of the spring member 62 attached thereto to move therewith and rotate to the middle section of the movement space 144 thereof. When the valve stick 20 is rotated to the position for the discharge of hot water as shown in FIG. 4, the locating support block 612 with the actuating insert leg 621 of the spring member 62 attached thereto is rotated along with the linkage rod 24 thereof and moved to the other side of the movement space 144 thereof till abutted against the limiting block 145 thereof. Thus, no matter the valve stick 20 is rotated to the position for the discharge of mixed cold/hot water or hot water, the linkage rod 24 fixed at the coupling hole 613 of the locating support block 612 will rotate with the valve stick 20 and move the actuating member 61 to pull the actuating insert leg 621 of the spring member 62 located at the fixing hole 614 therein towards the other side of the movement space 144 therewith. Meanwhile, the linkage section 21 of the valve stick 20 is tightly abutted against the inner lateral side of the retaining hole 42 of the switching valve 40 with a frictional coefficient thereof larger than the torque of the spring member 62 thereof so as to actuate the tipper switching valve 51 and open the valve core thereby. Thus, the valve stick 20 is precisely switched on and securely located in place for the discharge of mixed cold/hot water or hot water without being interfered by the influence of the spring member 62 thereof. When the valve stick 20 is switched off, the linkage section 21 thereof is simply located at the retaining hole 42 of the switching valve 40 therein with the actuating force of the valve stick 20 thereof smaller than the torque of the spring member 62, permitting the linkage rod 24 of the valve stick seat 22 to be quickly retracted by the actuating insert leg 621 of the spring member 62 and relocated thereby as shown in FIG. 5. Thus, the faucet thereof can automatically resume its position and safely keep in the state of cold-water discharge if switched open again in use, efficiently avoiding the ignition of a hot water supplier instantaneously so as to prevent the waste of energy, and securely protecting the safety of children in the family without being scared or even scalded by hot water accidentally in use.

What is claimed is:

1. An automatic cold water feed-back mechanism for a single handled faucet, including a valve housing for a valve stick, a base mount, a switching valve, a valve seat to be adapted therein; the present invention being characterized by that, a limiting valve is mounted at the upper section of the valve housing and a cold water feed-back mechanism is mutually engaged with the limiting valve thereof wherein the cold water feed-back mechanism is linked with the valve stick thereof in movement so that when the valve stick is switched off at the position of either mixed cold/hot water or hot-water discharge, the cold water feed-back mechanism will flexibly retract the valve stick thereof back to its position of cold water discharge; thus, the faucet can automatically resume its position and safely keep in the state of cold-water discharge if switched open again in use, efficiently avoiding the ignition of a hot water supplier instantaneously so as to prevent the waste of energy, and securely protecting the safety of children in the family without being scared or even scalded by hot water accidentally in practical use.

2. The automatic cold water feed-back mechanism for a single-handled faucet as claimed in claim 1 wherein the limiting valve is made up of an arc-shaped locating groove preset at the inner wall therein, a through hole communicating with the locating groove thereof, an annular stop flange protruding outwards at the upper opening thereof, a movement space properly cut at the outer periphery of the stop flange thereon, a limiting block protruding at the upper surface of the stop flange thereon, and a stepwise limiting seat extending outwards at the lower opening thereof.

3. The automatic cold water feed-back mechanism for a single-handled faucet as claimed in claim 1 wherein the valve stick is provided with a linkage rod properly protruding at the upper surface of a valve stick seat.

4. The automatic cold water feed-back mechanism for a single-handled faucet as claimed in claim 1 wherein the cold water feed-back mechanism is made up of an actuating member and a spring member; the actuating member has a limiting engaging hole disposed at the center thereon to be registered with the limiting valve thereby, and a locating support block extending transversely inwards at one side of the upper edge thereon; a coupling hole shaped like the linkage rod of the valve stick thereof and a fixing hole are respectively disposed at the surface of the locating support block thereon; the spring member is provided with an actuating insert leg protruding vertically upwards at the upper edge thereon, and an L-shaped locating hook extending inwards at the lower edge thereof.

\* \* \* \* \*